E. LANGGUTH.
APPARATUS FOR THE TREATMENT OF ORES.
APPLICATION FILED OCT. 4, 1912.
1,169,270.
Patented Jan. 25, 1916.
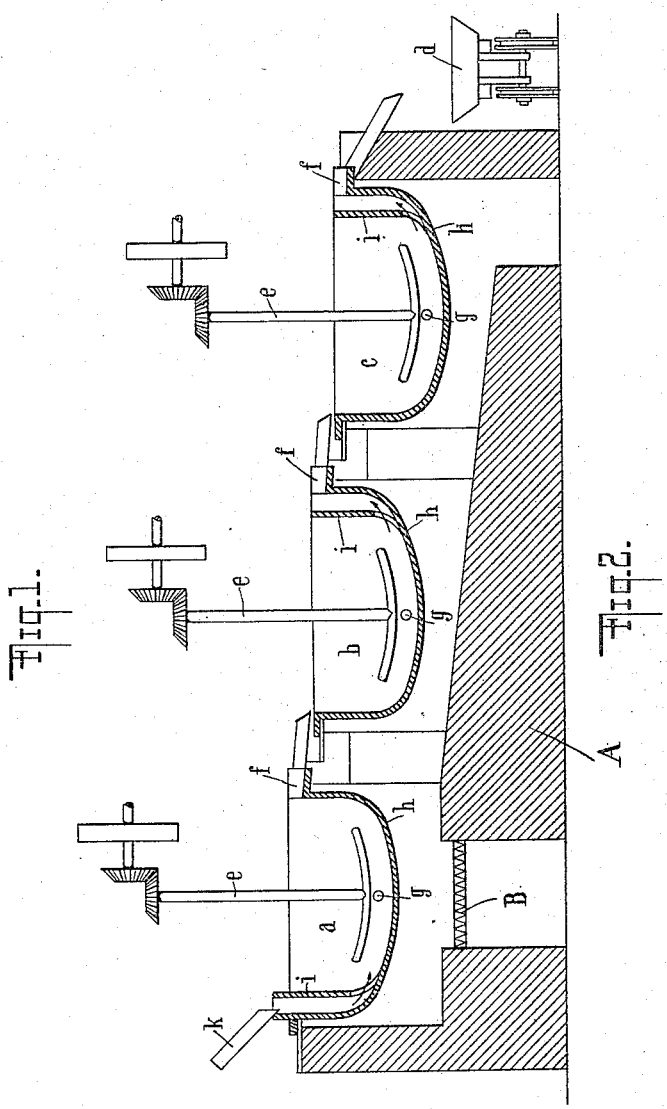
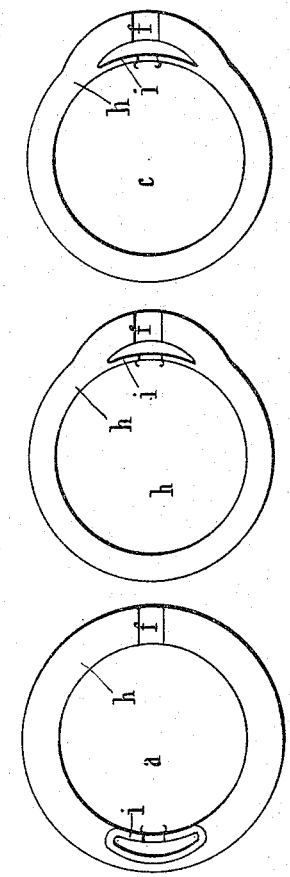
WITNESSES
George Du Bon
G. V. Rasmussen
INVENTOR
Erich Langguth
BY
Biesen & Knauth
ATTORNEYS

UNITED STATES PATENT OFFICE.

ERICH LANGGUTH, OF NEERPELT, BELGIUM.

APPARATUS FOR THE TREATMENT OF ORES.

1,169,270.  Specification of Letters Patent.  Patented Jan. 25, 1916.

Original application filed February 10, 1912, Serial No. 676,869. Divided and this application filed October 4, 1912. Serial No. 723,820.

*To all whom it may concern:*

Be it known that I, ERICH LANGGUTH, a subject of the King of Prussia, and a resident of Neerpelt, in the Province of Limbourg, Belgium, have invented a new, useful, and Improved Apparatus for the Treatment of Ores, of which the following, taken in connection with the accompanying drawings, is a specification.

My invention relates to apparatus for the treatment of ores containing lead, silver and zinc, ores containing lead and silver and ores containing silver. Heretofore the process of treating such ores by decomposing them by means of chlorid of zinc, or a mixture of zinc chlorid and alkali chlorid, and reducing the resulting lead chlorid and silver chlorid by means of zinc, has been carried out in a single vat or boiler. The whole of the lead obtained as a result of this process had then to be subjected to a desilverizing process, since the silver was naturally distributed throughout the whole mass of the lead.

By the use of the apparatus of my invention the above process is divided into a number of phases or steps. I am thus enabled to obtain the silver and the lead separately and to carry on the treatment as a continuous process instead of a periodic or intermittent one and to secure a complete separation of the metal from the molten mass with which the metal is mixed.

The process of treating ores in which the apparatus of my present invention may be used constitutes the subject matter of my application, Serial No. 676869, filed Feb. 10, 1912 and entitled Process of treating ores, of which this application is a division.

One form of the apparatus of my invention is shown in the accompanying drawings in which—

Figure 1 is a longitudinal section of the apparatus and Fig. 2 is a plan view of the series of decomposing vessels, the supports therefor and other parts being omitted.

The apparatus comprises a plurality of integral decomposing vessels, pots or vats. In the form of apparatus illustrated, the vats are three in number and are indicated by the reference characters $a$, $b$, and $c$. The pots are arranged in tiers, as clearly shown, and are supported suitably in a furnace A provided with a grate B below the vat $a$. Each vat is provided with a stirrer or agitator $e$, driven in any suitable manner, as by the shafting and gearing shown. Each vat is furthermore provided with an overflow duct $f$, and a discharge aperture $g$ normally closed by a removable closure plug. Through the apertures $g$ the reduced metal may be withdrawn. Through the ducts $f$ the supernatant molten mass may overflow into the next lower vat and finally into the transportable vessel $d$, by means of which the mass is carried to the dissolving device (not shown). The chlorid with which the ore is treated may be introduced into the vat through the conduit $h$.

In practising my invention I have found it particularly useful and beneficial to employ vats, each having an integral dividing diaphragm, reaching almost to the bottom of the vat and dividing the latter into two parts, a main compartment of circular cross section and a secondary compartment of crescent cross section. Through the secondary compartment of the vat $a$, the molten mass is supplied to said vat, while through the secondary compartments of vats $b$ and $c$, the mass is withdrawn from said vats. The diaphragm may also extend to the bottom of the vat and have a number of holes through the lower part thereof. The diaphragm forming the inner wall of the secondary compartment has the same convexity or curvature as the side wall of the adjacent main compartment and the outer similarly shaped wall of the secondary compartment merges into the side and bottom walls of the main compartment. The side and bottom walls of the vat are merged together by a curved connection and the diaphragm is merged into said bottom wall by a curved connection of the same convexity as that of the curved connection first mentioned. Thus the entire inner surface of the diaphragm constitutes an unbroken continuation of the inner surface of said main compartment side and bottom walls. Because of the peculiar formation of the walls of the secondary compartment, they are capable of withstanding the general wear and tear of use, including knocks and the friction of the solid pieces against the diaphragm during the stirring process so that a long life thereof is assured. Furthermore by giving the diaphragm the same curvature as the rest of the vat and making their inner surfaces continuous, I avoid the formation of "dead" corners, and by constructing the secondary compartment with an outer wall merging into that of the main compartment, I avoid all pressures and strains in the wall of the vat, due to changes in temperature. The outer wall of each of the vats is indicated in the drawings by the reference character $h$ and the diaphragm by the character $i$.

In the utilization of my apparatus for the treatment of ores the main part of the silver and the gold is taken out of the molten mass of chlorids formed by treating the ores with zinc chlorid, in the vat $a$ by adding metallic and preferably silver-bearing lead, a part of the lead going over to the molten mass as lead chlorid and an equivalent amount of silver chlorid being reduced. The remainder of the silver and a small part of the lead is extracted in the vat $b$ by adding a corresponding quantity of zinc thereto. The lead from the vat $b$ contains but little silver and may be used for the first desilverization of the molten mass in the vat $a$. In the vat $c$ the main part of the lead of the molten mass is precipitated quantitatively by means of zinc.

It may be seen that, since only a small quantity of lead rich in silver is obtained from the vat $a$ and the greater part of the lead, free of silver from the vat $c$, the cost of extracting the silver is much less than that of the old process hereinbefore mentioned.

It is obvious that the process may be carried out in such a manner that lead of a quality suitable for cupellation is obtained from vat $a$, and lead suitable for zinc-desilverization from vat $c$.

Instead of employing three vats for carrying out the process, it is clear that two only may be employed, although in the latter case the concentration of the silver can not be carried out so thoroughly. In this case lead rich in silver would be obtained from the first vat by means of zinc and lead containing a small percentage of silver or lead containing no silver at all would be obtained from the second vat. It is also clearly possible to employ four or more vats instead of three, the advisability of such increase depending principally upon the character of the ore. When three or more vats are employed, the reduction of the silver by means of zinc may be made to take place in the first vat.

Since the molten mass is always discharged through the overflow ducts or pipes $f$ and the metal through the discharge holes $g$ in the bottoms of the vats, as described above, it is impossible for particles of metal to be carried over from one vat to the other and the separation of the metal from the molten mass is always much more complete than in the intermittent process, herein before referred to, in which the metal and the molten mass are poured out of the same discharge pipe the one after the other.

I claim:

An apparatus for the treatment of an ore containing silver, comprising an integral vat provided with a curved side wall and a bottom wall merged into said side wall by a curved connection and being divided into a main compartment of circular cross section and a secondary compartment of crescent cross section by an integral diaphragm extending to the bottom of the vat and provided with an aperture near said vat bottom to establish communication between said compartments, the said diaphragm being of the same convexity as that of the side wall of said main compartment and being merged into said bottom wall by a curved connection of the same convexity as that of the curved connection first mentioned, whereby the entire inner surface of the diaphragm constitutes an unbroken continuation of the inner surface of said main compartment side and bottom walls, and the outer wall of said secondary compartment being curved so as to merge into the side and bottom walls of the main compartment.

In testimony whereof I have hereunto set my hand in the presence of two subscribing witnesses.

ERICH LANGGUTH.

Witnesses:
C. WEINGARTEN,
LOUIS VANDORY.